Patented June 19, 1934

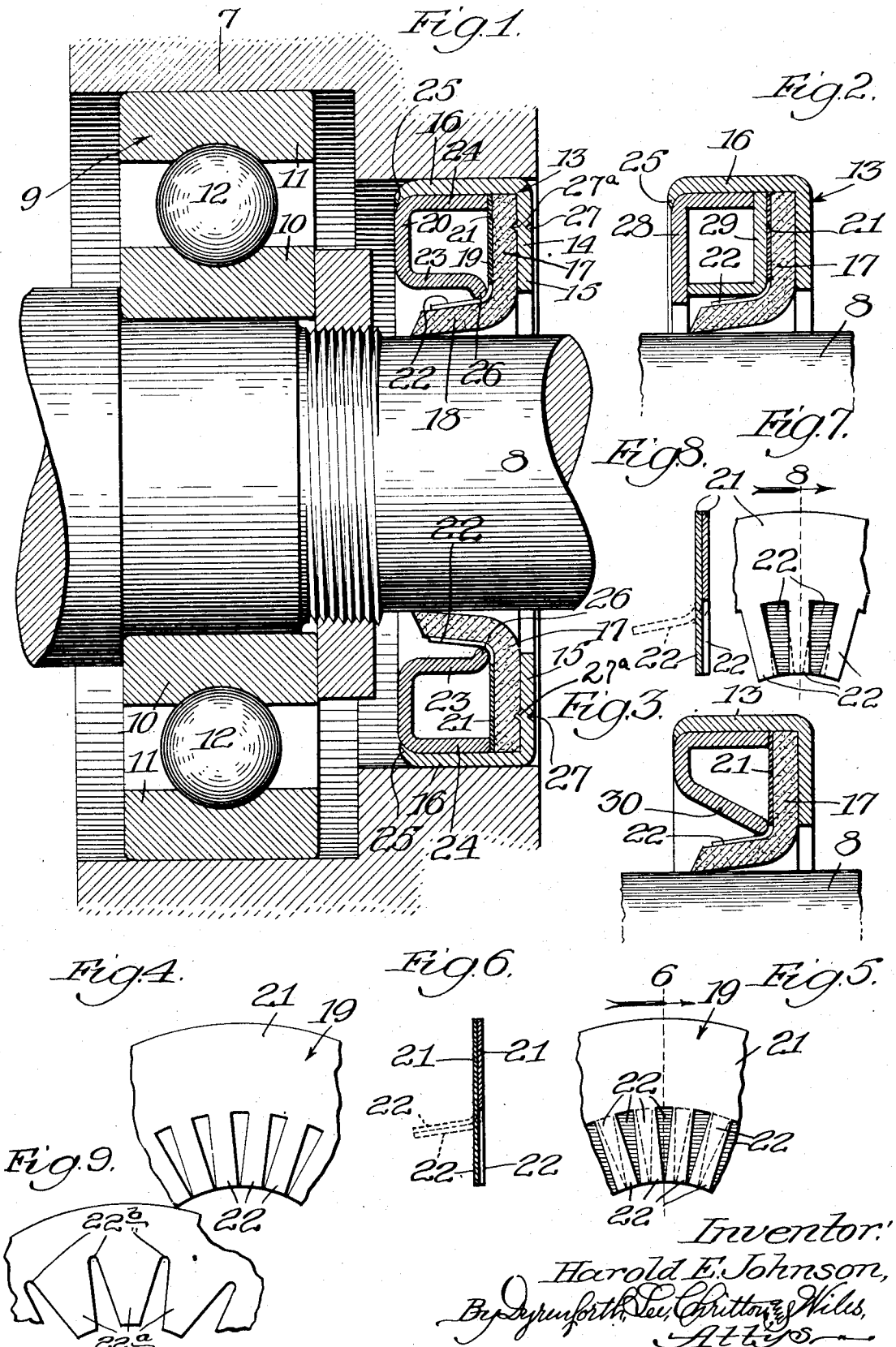

1,963,465

UNITED STATES PATENT OFFICE 1,963,465

SEALING MEANS

Harold E. Johnson, Evanston, Ill., assignor to Chicago Rawhide Manufacturing Company, Chicago, Ill., a corporation of Illinois Application May 4, 1931, Serial No. 534,947

9 Claims. (Cl. 288—1)

My invention relates to oil or grease seals or retainers for use generally in connection with elements at which seals are to be effected, as for example, and more particularly, rotatable shafts to prevent the lubricating oil or grease from escaping along the rotating shafts and also to prevent the ingress of dirt, dust and other foreign matter to the housings in which the bearings for the shafts are located and which would damage the bearings, the seals being applicable to installations in general involving rotating shafts, such as for example axle shafts of automobiles and revolving shafts protruding from transmissions, gear boxes, etc.

My objects are to provide a seal for the general purpose above referred to, which will not require manual adjustment after installation, but will be self-adjusting to maintain a perfect seal in the continued operation of the, element such as a shaft, in connection with which it is used; to provide a simple and economical construction of seal; to provide a construction of seal which normally will not require replacement; to provide a construction of seal which will provide and maintain a perfect seal even though the element at which the seal is to be effected may be eccentric relative to the bearing housings; to provide a construction of seal which will be selfcontained; and generally to improve upon sealing means as hitherto provided.

Referring to the accompanying drawing:

Figure 1 is a broken view in longitudinal section of a shaft and bearing assembly equipped with my improved sealing means.

Figure 2 is a fragmentary view like Fig. 1 of a modification of the sealing means.

Figure 3 is a similar view of another modification of the sealing means.

Figure 4 is a broken face view of a spring ring forming an element of the sealing means.

Figure 5 is a broken face view of a plurality of the rings of Fig. 4 illustrating the relative positioning thereof for forming a laminated spring ring structure.

Figure 6 is a section taken at the line 6 on Fig. 5 and viewed in the direction of the arrow, the tongues forming parts of these rings being shown by dotted lines in operative position.

Figure 7 is a view like Fig. 5 of a modification of the structure shown therein.

Figure 8 is a section like Fig. 6 taken at the line 8 on Fig. 7 and viewed in the direction of the arrow; and Figure 9, a broken face view of a modification of the spring rings of the preceding figures.

Referring to Figs. 1 and 4 of the drawing, 7 represents a bearing housing which, by way of example, may be the bearing housing of an automobile shaft, and 8 a rotating shaft, as for example the rotating axle of an automobile, there being interposed between the shaft 8 and the bearing housing ball bearings 9 comprising inner and outer race-ways 10 and 11, respectively, and a series of balls 12 interposed therebetween.

The structure above described is equipped with sealing means, in accordance with one embodiment of my invention, for preventing the escape of the fluid lubricant from the bearing housing along the shaft toward its outer end, viz., to the right in Fig. 1, and to prevent the ingress of dirt, dust and other foreign matter to the bearing housing.

The sealing means referred to comprises a cage, or container 13 of annular cup form which surrounds the shaft 8 and is positioned in the bearing housing 7 in sealed stationary engagement therewith, the cage comprising a ring 14 of angular shape in cross-section affording a ring section 15 disposed normal to the axis of the shaft 8 and an annular flange section 16 extending from the circumferential margin of the section 15 and concentric with the shaft 8.

Located in the cage 13 is an annular ring-like packing member 17 of rawhide, leather, or other suitable packing material, which fits flatwise at its outer marginal portion against the inner face of the ring 14, its inner annular marginal portion being deflected as represented at 18, the member 17 snugly embracing the shaft 8 at the outer marginal edge of the deflected portion 18.

The packing member 17 is sealed within the cage 13 and held constantly in close, sealing, engagement at its portion 18 with the shaft 8 by a spring member 19 and a cover member 20. The spring member 19 is of ring form providing a solid outer ring portion 21 from the inner edge of which a circular series of spring tongues 22, integral with the ring portion 21, radiate, the member 19 fitting flatwise against the inner surface of the ring 15 as shown and conformably fitting at its tongues 22, in the flexed condition shown in Fig. 1, against the outer surface of the flange-portion 18 of the packing ring, these tongues thus surrounding the flange-portion 18 and under their spring tension urging the flange portion 18 in close embracing and sealing engagement with the shaft 8.

The cover-member 20, which clamps the spring member 19 against the packing ring 17 and the latter, in turn, against the ring portion 15 of the cage 13, is of channel form and fits telescopically within the cage, the concentric side walls of its channel and represented at 23 and 24 extending inwardly into the cage 13 and the outer edge of the ring section 16 being spun into overlapping engagement with the member 20 as shown at 25.

The side wall 23 of the cover member 20 is preferably inwardly curved as represented at 26 at which portion it engages the spring fingers 22 at the points of flexure of the latter.

The spring member 19 in normal condition is flat as shown in Fig. 4 and in the assembling of the parts of the seal the tongues 22 are deflected in the pressing of the member 19 into assembled condition with the packing member 17 in which condition the tongues 22 conformably fit, under tension, the surface of the packing member 17 which they oppose. Thus when the sealing structure is assembled with the shaft 8 the flange portion 18 of the packing member engages the shaft 8 circumferentially under tension at the extreme end of the flange portion 18; thereby forming a permanent and self-adjusting seal at the point of contact of the packing member with the shaft.

As means for positively maintaining the packing member 17 against rotation with the shaft 8 I indent the ring-section at intervals, as represented at 27, which produce projections 27ª at the opposite surface of this section which become embedded in the packing member 17 in the assembling of the parts of the sealing device.

Referring to Fig. 2 of the drawing, the parts thereof are the same as in the construction shown in Figs. 1 and 4 except that, instead of providing the cover member as a one-piece structure, it is formed of two annular sections represented at 28 and 29, these sections being assembled to form a ring structure of hollow rectangular form in cross section, the section 29 being held in place against the spring member 22 by the section 28 which latter, in turn, is held in place by the inturned spun portion 25 of the cage 13.

The construction shown in Fig. 3 differs from that shown in Figs. 1 and 4 only in the particular that the inner side wall of the channel of the cover-member, and represented at 30 instead of being generally parallel with the axis of the shaft 8 is disposed at an angle thereto and is straight throughout its extent.

If desired the tensioning element for the packing member instead of being formed of a single tongue-equipped ring as above explained, may be of laminated construction as for example as shown in Figs. 5 and 6 or 7 and 8 wherein two of the spring rings are used to form a two-ply spring structure, these rings being preferably so positioned relative to each other that the tongues of one ring are staggered relative to those of the other ring as shown.

According to the showing in Figs. 5 and 6 the tongues 22 are of a width greater than the spaces between adjacent ones of the tongues, whereas in the construction shown in Figs. 7 and 8 the tongues 22 of the outermost ring are slightly narrower than the spaces between the tongues 22 of the other ring whereby when the rings are assembled with the packing member 17 and these assembled parts applied to position on the part to be sealed, the tongues on the outer ring, as also the tongues on the inner ring, will engage the flange 18 of the packing member as shown in Fig. 8.

Thus by these constructions a more uniform and augmented tension on the packing member may be produced than in the case of the use of a single spring member, the construction shown in Figs. 7 and 8 producing the more nearly uniform tension as a substantially circumferentially continuous pressure is exerted by the tongues on the flange of the packing member.

Figure 9 shows a modification of the spring ring. In this construction instead of providing the tongues with parallel side edges as shown in the preceding figures of the drawing, the side edges of the tongues herein represented at 22ª converge toward the center of the ring and the end walls of the spaces between the tongues are rounded as shown at 22ᵇ to minimize danger of fracture. This form of ring may be used not only singly as described of the spring rings of the preceding figures, but also in multiple to provide a plural ply spring structure with the tongues of adjacent rings staggered as above explained of the other rings.

While I have illustrated and described certain embodiments of my invention, I do not wish to be understood as intending to limit it thereto as the invention may be embodied in other forms of structure and those shown may be variously modified and altered without departing from the spirit of my invention.

What I claim as new, and desire to secure by Letters Patent, is:

1. In a seal, the combination of a packing ring having a flange at its central portion for encircling an element at which the seal is to be effected, a cup shaped retainer into which said ring extends, a member in said retainer having spring tongues disposed around said flange and operating by their spring tension to constrict said flange about said element, and a cover of channel form in cross-section for said retainer, said channel opening inwardly and its side walls engaging said member.

2. In a seal, the combination of a packing ring having a flange at its central portion for encircling an element at which the seal is to be effected, a cup shaped retainer into which said ring extends, a member in said retainer having spring tongues disposed around said flange and operating by their spring tension to constrict said flange about said element, and a cover of channel form in cross-section for said retainer, said channel opening inwardly and its side walls engaging said member, the engagement of the innermost one of said walls being at said tongues.

3. In a seal, the combination of a packing ring having a flange at its central portion to encircle an element at which the seal is to be effected, a member having spring tongues disposed around said flange and operating by their spring tension to constrict said flange about said element, said member being formed of a plurality of flatwise opposed disks each provided with spring tongues, the tongues on adjacent disks being disposed in staggered relation, and the tongues on the outermost disk being of such width that they extend into the spaces between the tongues of the other of said disks and press against said flange.

4. In a seal, the combination of a packing ring having a flange at which it bears against the element at which the seal is to be effected, a holder for said ring, a member associated with said holder and having spring tongues bearing against said flange and operating by their spring tension to force said flange against said element, and a cover ring of channel form in cross section, said channel opening toward said packing ring and its side walls engaging said member.

5. In a seal, the combination of a packing ring having a flange at which it bears against the element at which the seal is to be effected, a holder for said ring, a member associated with said holder and having spring tongues bearing against said flange and operating by their spring tension to force said flange against said element, and a cover ring of channel form in cross section, said channel opening toward said packing ring and its side walls engaging said member, the engagement of one of said side walls being at said tongues.

6. In a seal, the combination of a packing ring having a flange at which it bears against the element at which the seal is to be affixed, a member having spring tongues bearing against said flange and operating by their spring tension to force said flange against said element, said member being formed of a plurality of flatwise opposed disks each provided with spring tongues, the tongues on adjacent disks being disposed in staggered relation and the tongues on the outermost disk being of such width that they extend into the spaces between the tongues of the other of said disks and press against said flange.

7. In a seal, the combination of a packing ring comprising a body portion and a flange adapted to bear at its side against the element at which the seal is to be effected, a member having spring tongues bearing against said flange and operating by their spring tension to force said flange against said element, and a second member engaging said first-named member beyond said tongues for holding said first-named member in place and engaging said tongues for forcing the latter toward said flange.

8. In a seal, the combination of a packing ring comprising a body portion and a flange adapted to bear at its side against the element at which the seal is to be effected, a member having spring tongues bearing against said flange and operating by their spring tension to force said flange against said element, and a second member engaging said first-named member beyond said tongues for holding said first-named member in place and engaging said tongues at the interior angle between said body portion and flange for crowding said tongues into said interior angle.

9. In a seal, a two-part annular casing, which casing is composed of a centrally apertured cup and a cover ring of channel form in cross section which opens toward the bottom of the cup and is held in position under pressure by an inturned edge on the rim of the cup, a packing ring positioned in the casing against the bottom of the cup and provided with an axially extending inner portion which projects in the same direction as the rim of the cup for sleeved association with a rotating shaft, and a spring ring positioned in the casing between the cover ring and the packing ring and provided with tongues in engagement with the inner portion of the packing ring, said cover ring acting through the spring ring to maintain the packing ring in sealed association with both the casing and the shaft the packing ring is adapted to fit about, the outer side wall of the above mentioned channel in the closure ring being in compressed association with the outer portion of the packing ring whereby to prevent leakage through the casing past said outer portion, and the inner side wall of said channel acting through the spring ring to constrict the inner portion of the packing ring whereby to prevent leakage along the shaft.

HAROLD E. JOHNSON.